United States Patent [19]

Baker et al.

[11] 4,248,510

[45] Feb. 3, 1981

[54] IDENTIFICATION CARD CAMERA SYSTEM

[75] Inventors: Philip G. Baker, Peabody, Mass.; Herbert A. Bing, Ossipee, N.H.; Myron A. Seiden, Needham, Mass.

[73] Assignee: Polaroid Corporation, Cambridge, Mass.

[21] Appl. No.: 52,439

[22] Filed: Jun. 26, 1979

[51] Int. Cl.³ .............................................. G03B 17/24
[52] U.S. Cl. .................................... 354/109; 354/119; 354/210
[58] Field of Search ............... 354/109, 210, 118, 119, 354/105, 106; 352/239; 50/194, 211

[56] References Cited

U.S. PATENT DOCUMENTS

| | | | |
|---|---|---|---|
| 1,966,503 | 7/1934 | Hunter | 352/239 X |
| 2,481,717 | 9/1949 | Blair . | |
| 2,896,522 | 7/1959 | Stein . | |
| 3,631,773 | 1/1972 | Moodie . | |
| 3,643,570 | 2/1972 | Reid et al. , | |
| 3,683,764 | 8/1972 | Johnson . | |
| 3,722,393 | 3/1973 | Drevitch . | |
| 3,827,070 | 7/1974 | Hoerenz et al. | 354/105 |
| 3,838,435 | 9/1974 | Mepham et al. | 354/109 |
| 3,906,523 | 9/1975 | Ogiso et al. | 354/109 |
| 3,928,863 | 12/1975 | Stewart et al. | 354/109 |
| 3,972,593 | 8/1976 | Appeldorn et al. | 350/211 |
| 4,081,808 | 3/1978 | Pizzuti | 354/193 |

OTHER PUBLICATIONS

Lipton, L., *Independent Filmmaking*, Published by Simon & Schuster, N.Y., N.Y., 1972, pp. 28, 29.

*Primary Examiner*—John Gonzales
*Attorney, Agent, or Firm*—David R. Thornton

[57] ABSTRACT

An identification camera system for producing an identification type card having a composite image of both a subject and a data bearing card and for producing an encoded film record of the identification card includes a first lens for photographing the subject and a second lens for photographing the data card. The light from the subject and the data card is polarized in orthogonal planes and directed by a beam splitter through image analyzers onto mutually exclusive areas of first and second image planes. Self-developing film of the type marketed by Polaroid Corporation, for example, is located at the first image plane and, after exposure to the optically resolved subject and data card images, is developed to form the identification card, and strip film, e.g., a super 8 mm movie-type film contained within a movie camera, is located at the second image plane and receives an optically resolved subject and data card exposure identical to that received by the self-developing film to provide a permanent record of the identification card. Encoding means are provided to uniquely encode each frame of the strip film record with information, e.g. the serial number, frame number, and like information, to enable convenient retrieval of the identification card record.

10 Claims, 8 Drawing Figures

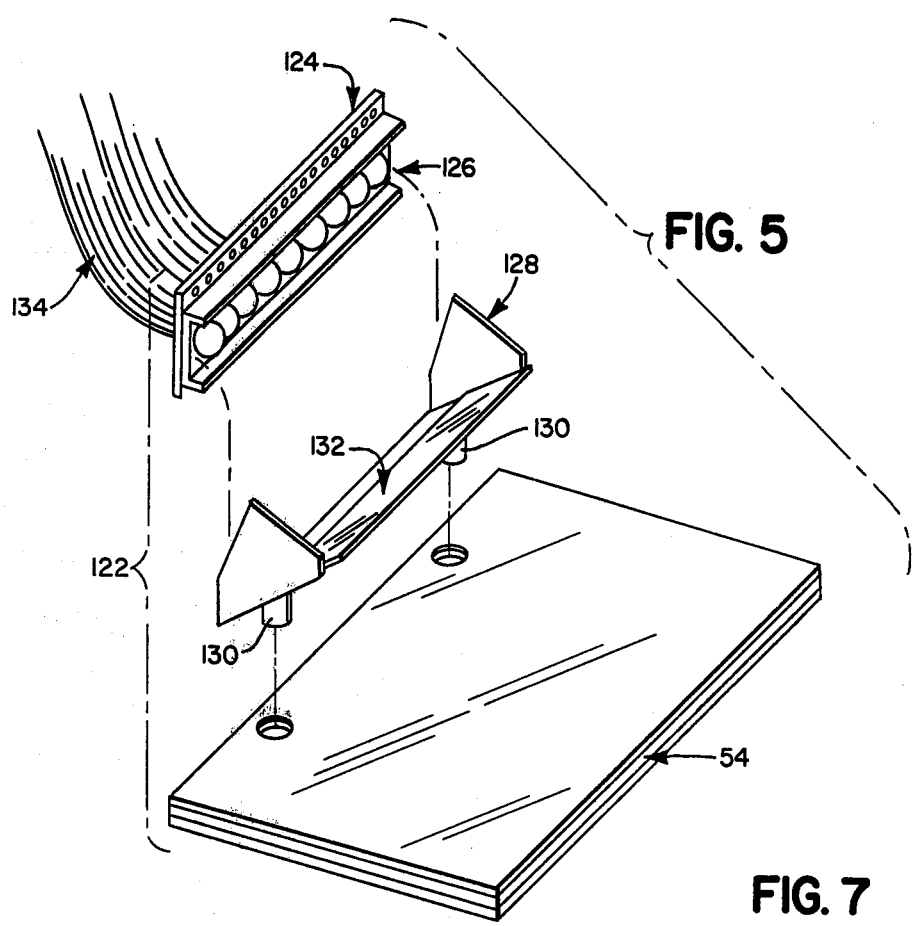
FIG. 5
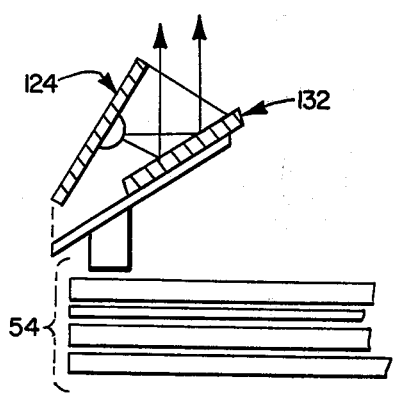
FIG. 6
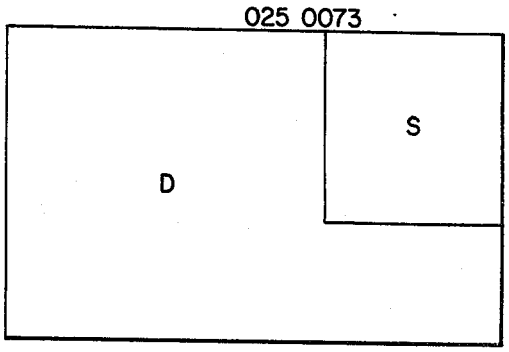
FIG. 7
FIG. 8

IDENTIFICATION CARD CAMERA SYSTEM

BACKGROUND OF THE INVENTION

The present invention relates to an identification card camera system and, more particularly, to an identification card camera system for producing an identification card having a photograph of a subject and a data bearing card on mutually exclusive areas of the identification card and for providing a permanent strip film record of each identification card produced by the camera system.

Identification camera systems are known for producing identification cards having a photograph of a subject, a validating mark or logo, and biographical information relating to the subject including the signature, the date of birth, and various physical characteristics of the subject. Identification cards of this type have found widespread use as driver's licenses, employee identifications, and for association memberships.

Prior camera systems are known for producing composite identification cards with some of these systems providing both an identification card and a permanent photo record of each card produced. The photo records can be used for a variety of purposes, e.g. to produce a duplicate identification card to replace a lost or stolen card and to compare an issued card with its photo record to determine if the card has been tampered with or altered. Camera systems of the type which produce a photo record of each card use various optical arrangements to form the composite subject and data card images on mutually exclusive areas of a self-developing film plane and a recorded image film plane. The optical arrangements have included dual subject and data card imaging lens systems, an example of which is disclosed in U.S. Pat. No. 3,928,863 to Stewart et al. This camera system uses first and second objective lenses and specially configured mirrors having silvered and unsilvered portions to direct light from a subject to the subject area of first and second image planes and third and fourth objective lenses to direct light from a data bearing card to the data occupying area of the first and second image planes. Self-developing film is located at the first image plane, and, after exposure, is developed to produce the final identification card, and a frame of 35 mm strip film is located at the second image plane to provide a permanent photo record of the identification card.

While identification card camera systems of the type described are adequate to perform their intended function, the use of two separate lenses to form the subject image presents a problem from the security standpoint. An unauthorized person could cover the subject lens that images on the recorded image film plane and then operate the camera to provide an identification card without also producing a recorded image of the complete card. In addition to the ease with which these types of cameras can be used to produce an unauthorized identification card, the use of dual, multiple lens systems and specially configured mirrors results in a camera having an optical system that is expensive to manufacture, assemble, and align.

SUMMARY OF THE INVENTION

The present invention provides a camera which uses a single subject lens and a single data card lens to form composite subject and data card images on mutually exclusive areas of an image plane for producing an identification card and another image plane for producing a photo record of the composite image. Actuation of the photo record portion of the system in turn actuates the card exposure so that an identification card cannot be produced unless a complete photo record of the composite image is also provided. Light from the subject is passed through a subject lens and plane polarized in a first direction prior to being divided and directed by a beam splitter towards a first image plane as defined by a sheet of self-developing film and towards a second image plane as defined by a ground glass and Fresnel plane through which it passes to a third image plane defined by a frame of strip film contained within a recording camera operated in a single frame mode. Light from the data card is passed through a data card lens and plane polarized in a second direction, at right angles to the first direction, prior to being divided and directed by the beam splitter towards the first, second and third image planes. Image analyzers in both the identification card and recorded image optical paths resolve the polarized light to form well-defined images of the subject and the data card at the first and second image planes. A Fresnel-type lens assembly is provided to optically correct the different lengths and direction of the optical paths from the subject and data lens pupils so as to image the exit pupils of the face and data lenses into the entrance pupil of the recording camera lens, and a numerical display is provided to uniquely encode each frame of the recorded image film. The recording camera includes a modified exposure aperture which provides data and face images on the strip film which occupies an extended area to provide an image larger than that normally available with standard strip film type recording cameras.

It is an object of the present invention to provide an identification type camera system which produces both an identification card having a composite image of a subject and a data as well as a photo record of the same, and which cannot be operated to produce an identification card without also providing a photo record of the composite image. Other objects of the present invention include providing a compact identification-type camera with a reduced number of optical elements to provide an optically efficient design, to provide an identification-type camera with a straight forward optical arrangement which is simple to assemble and align, and to provide an identification-type camera which provides a uniquely encoded photo record of each identification card produced by the system.

BRIEF DESCRIPTION OF THE DRAWINGS

FIG. 5 is an exploded perspective view of a character encoding display for uniquely encoding the strip film record of each identification card produced by the camera system;

FIG. 6 is a side elevational view, in cross-section, of the character encoding display of FIG. 5 shown in its assembled form;

FIG. 7 is an illustration of the identification card format produced by the camera system of the present invention; and FIG. 8 is an enlarged illustration of the recorded strip film image of the identification card with its encoded character information.

DESCRIPTION OF THE PREFERRED EMBODIMENT

Figure 2:
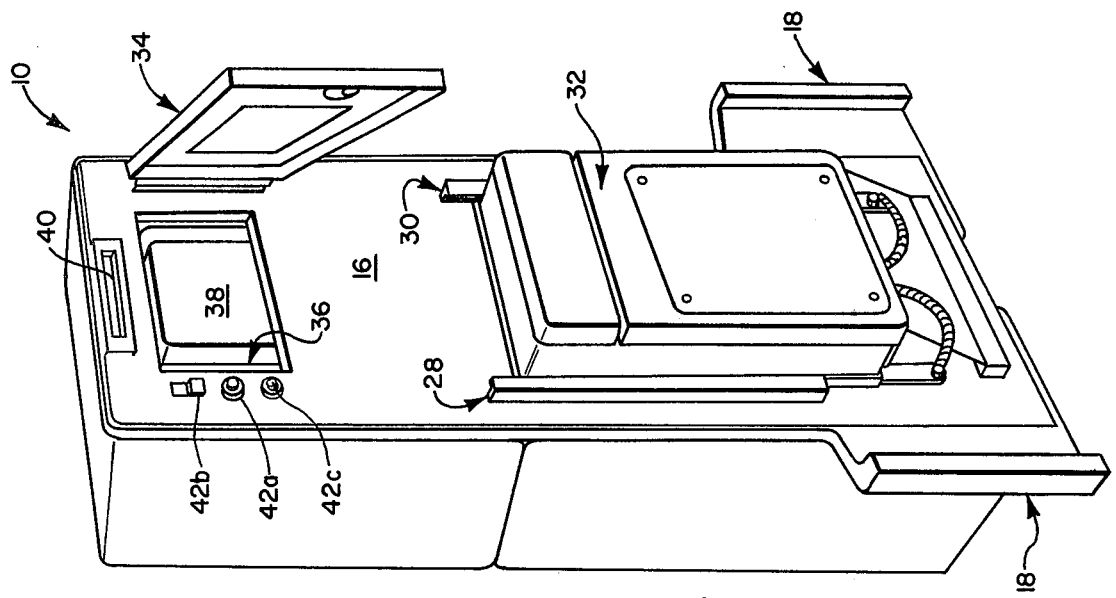
FIG. 2 is a rear perspective view of the identification card camera system shown in FIG. 1.
Figure 1:
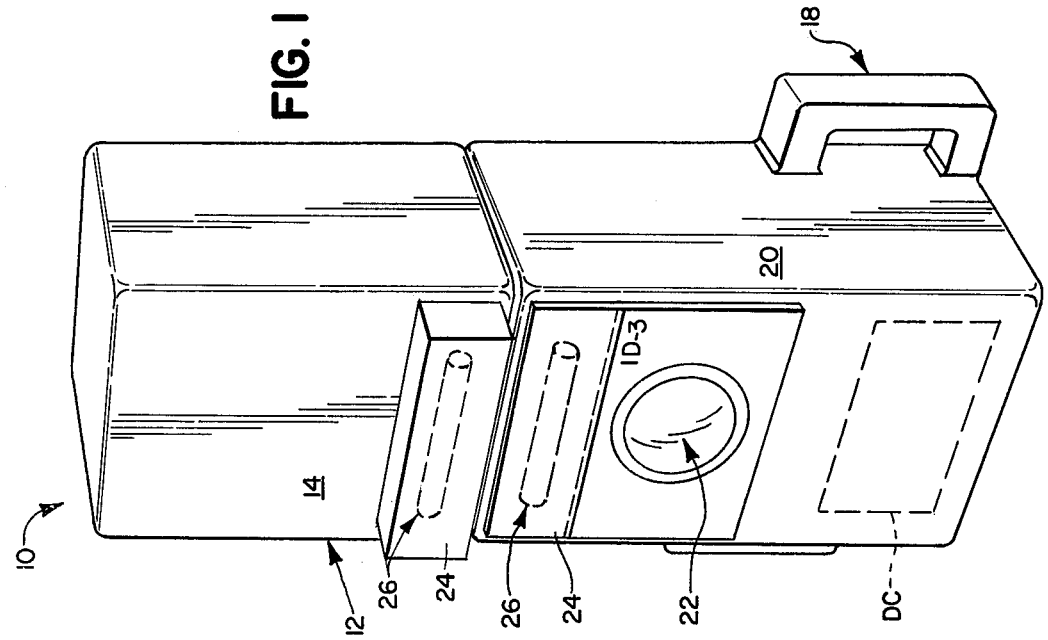
FIG. 1 is a front perspective view of an identification card camera system in accordance with the present invention.

An identification card camera 10 in accordance with the present invention is shown in front and rear perspective in FIGS. 1 and 2 to include a light-tight housing 12 having front and rear panels, 14 and 16, with handles 18 extending laterally outward from the lower side panels 20. A push button type shutter control (not shown) is preferably provided on the upper edge of one of the handles 18 to permit convenient shutter operation. The front panel 14 includes an exposure opening 22 and rectangular openings 24 from which light from a pair of photo flash tubes 26 (broken line illustration) illuminates the subject. The camera 10 is provided with structure (not shown) for inserting and supporting a data bearing information card DC (see FIG. 3) in the lower portion of the housing 12. The data card support structure may take the form, e.g., of a side entry slide arrangement as disclosed in U.S. Pat. No. 3,631,773 or a hinged door arrangement as disclosed in U.S. Pat. No. 3,683,764. The rear panel 16 includes spaced apart guide rails 28 and 30 which are adapted to support a film back 32 containing sheets of self-developing positive film held against the rear panel such that a sheet of the film defines a first image plane or, that is, an identification card image plane. A light-tight door 34 is hinged to the upper part of the rear panel 16 and, when opened, provides access to an opening 36 of a frame-by-frame recording camera 56, later explained in more detail, formed through the rear panel. A strip film cartridge 38, e.g., a conventional super-8 movie film cartridge, may be mounted through the opening 36 at a third image plane or, more specifically, a photo-record image plane of the camera 56. A numeric display 40, which provides a numerical indication to the camera operator, is located above the opening 36, and various controls 42a, b, c and d adjacent the opening and the display 40 are provided to permit convenient operation of the camera 10.

The camera 10 is adapted to produce a composite identification card of the type shown in FIG. 7 having a rectangular portion S, bearing a positive image of the subject and an "L-shaped" portion D bearing the positive image of the data bearing card, and if desired, a validating design or logo. In addition to providing the identification card, the camera 10 also provides a photographic record of each card produced by the camera on the strip film contained within the cartridge 38. Each recorded image of the identification card, as shown in enlarged detail in FIG. 8, also includes an identifying number, identical to display 40, for record keeping or other administrative purposes.

Figure 3:
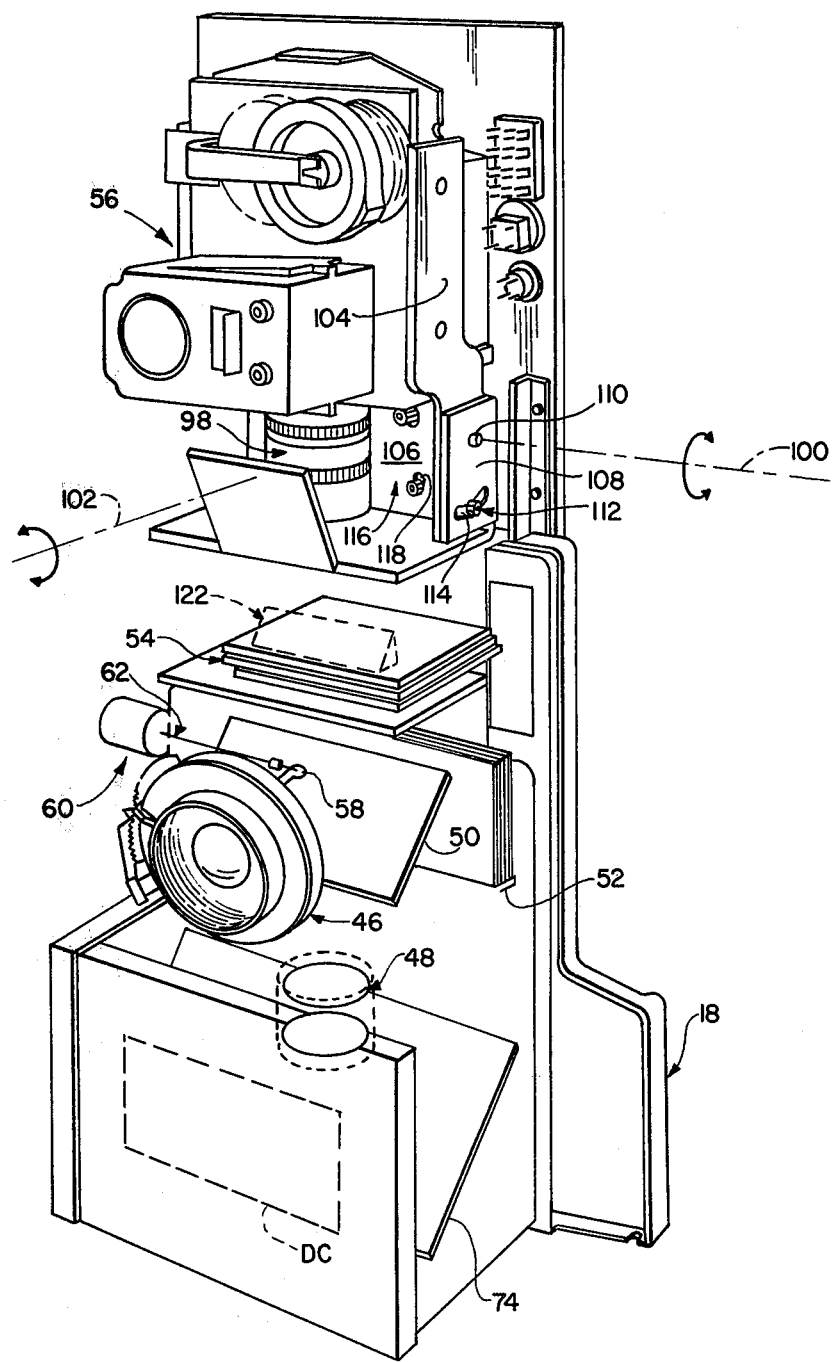
FIG. 3 is a front perspective view of the internal organization of the camera system shown in FIGS. 1 and 2.
Figure 4:
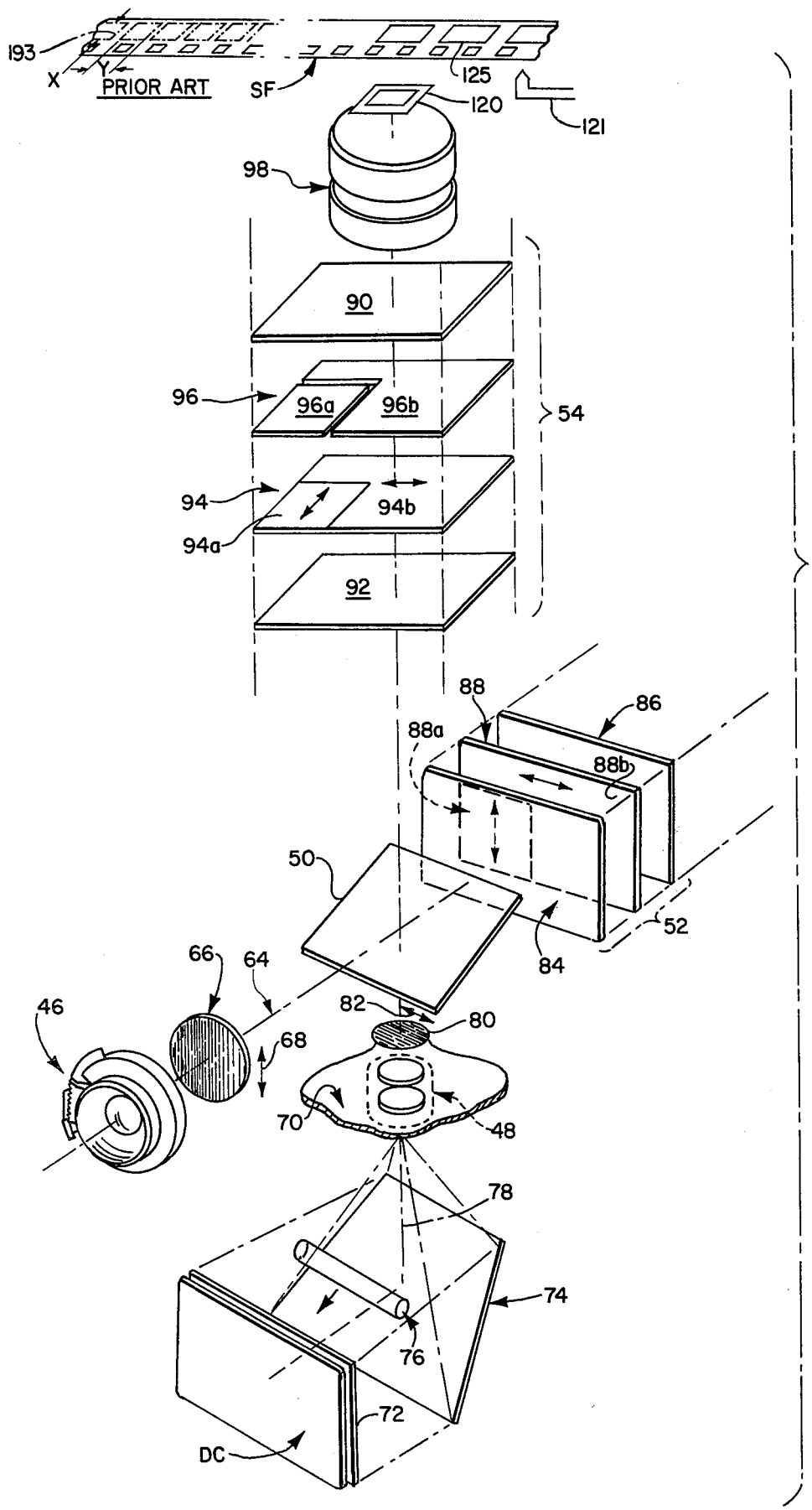
FIG. 4 is an exploded perspective view of the principal optical elements of the camera system shown in FIGS. 1-3.

The internal organization of the camera 10 is shown in perspective in FIG. 3, and the principal optical elements are shown in exploded perspective in FIG. 4. The optical elements define a composite subject optical system and data card optical system and include a subject lens and shutter assembly 46, a mirror 74, a data lens 48, a beam splitter 50, an image analyzer 52, and a diffuser and Fresnel assembly 54, and the recording camera 56. The subject optical system and the data card optical system are adapted to receive light from the subject and the data bearing card DC, respectively, and image the light onto the respective areas S and D of the identification card image plane and the photo record image film plane.

The lens and shutter assembly 46 is of a conventional design and includes the usual shutter speed and aperture controls and a shutter release 58 that is connected to a shutter actuator 60 by a flexible link 62 (FIG. 3) The photo record camera 56 also includes a lens 98 and a shutter assembly (not shown) which allows loading of the camera 56 without permitting light to pass to the identification card film plane. For reasons of security, the actuation of the photo record camera 56 is employed to initiate the overall operation of the composite camera 10. Thus, an identification card cannot be produced without actuating the photo record arrangement. In this regard, the photo record shutter is electrically actuated by a camera actuator button (not shown) and includes a synchronizing switch (also not shown) which, upon its closing, in turn, actuates the main shutter in assembly 46 by means of a solenoid 60. Hence, the solenoid 60 is connected to the flexible link 62 so as to trip the main shutter only when the photo record shutter is opened. Finally, the main shutter also includes a synchronizing switch (not shown) which fires the photo flash tubes 26.

As shown in FIG. 4, light from the subject is gathered by the subject lens and shutter assembly 46 and directed along a subject optical path 64 through a polarizing filter 66 located directly behind this assembly. The light is plane polarized, e.g., in the vertical direction as indicated by the double arrow 68, and directed onto the beam splitter 50. A fraction of the light from the subject, e.g., 30%, is transmitted through the beam splitter to the identification card image analyzer 52, and another fraction of the light is reflected upwardly towards the diffuser/Fresnel assembly 54; some light being lost by scattering and absorption in the beam splitter.

The data lens 48 is mounted on an internal partition 70 that divides the lower portion of the housing 12 into two compartments; the lower of which contains the data card DC, the reflecting mirror 74, and a photo flash tube 76 that is also operatively sychronized with the operation of the main shutter and the other photo tubes 26. Light from the triggered photo tube 76 illuminates the data bearing card DC, and the reflected light from the card is reflected by the mirror 74 upwardly along a data optical path 78 through the data lens 48 and another polarizing filter 80 located in the data optical path. The light passing through the filter 80 is plane polarized, e.g., in the horizontal direction as indicated by the double arrow 82, in a direction orthogonal to the polarizing plane 68 of the subject image. The light is directed upwardly onto the beam splitter 50 where a fraction of the light, e.g., 30%, is transmitted through the beam splitter towards the diffuser/Fresnel assembly 54, and the remaining fraction of the light is reflected by the beam splitter to the identification card image analyzer 52.

The light falling on both the identification card image analyzer 52 and the lens assembly 54 is a composite of the subject image plane polarized in a first direction and the data card image plane polarized in a second direction, at right angles to the first directon. As later explained, the diffuser/Fresnel assembly 54 also contains an analyzer plate 94, and the latter as well as the analyzer 52 function to resolve the light into the respective subject and data images and direct these images onto the mutually exclusive S and D areas of both the ID card image plane and the recorded image plane.

The identification card image analyzer 52 includes front and rear transparent supports 84 and 86, and an intermediate filter 88 that is fabricated from a first rectangular polarizing element 88a (broken line illustration) which is in registration with the subject area S of the final identification card, and a second "L-shaped" polarizing element 88b which is in registration with the data area D of the final identification card. The element 88a has its transmission plane oriented in the same direction as that of the subject image polarizer 66 (that is, in the vertical direction in the case of the preferred embodiment) and the element 88b has its transmission plane oriented in the same direction as the data image polarizer 80 (that is, in the horizontal direction). The element 88a transmits the subject image onto the self-developing film plane over an area corresponding to the subject areas of the identification card while blocking or at least greatly attenuating the data image in the subject area and, in a like manner, the element 88b transmits the data image onto the self-developing film plane over the "L-shaped" area corresponding to the data bearing area D of the final identification card while blocking or at least greatly attenuating the subject image in the area D.

The analyzer plate 96 of the assembly 54 functions, like the analyzer 52, to resolve the data and subject images at the recorded image plane, and in addition, the overall assembly also provides focal length and image path correction, and to this end includes upper and lower Fresnel plate lenses 90 and 92, the analyzer plate 94 that is fabricated from a subject area polarizing element 94a and a data area polarizing element 94b, and a composite unit 96 that includes a subject Fresnel lens 96a and a data diffuser 96b.

The filter element 94a has its transmission plane oriented in the same direction as that of the subject image polarizer 66 and transmits the subject image over an area corresponding to the subject area S of the identification card, and the filter 94b has its transmission plane oriented in the same direction as that of the data card image polarizer 80, at right angles to the subject image. The filter element 94a transmits the subject image while blocking or at least greatly attenuating the data card image, and the filter element 94b transmits the data card image while blocking or attenuating the subject image to provide well-defined mutually exclusive images.

The diffuser 96b functions to improve the brightness uniformity of the data image. On the other hand, the lenses 90 and 92 image the exit pupil of the data lens 48 into the entrance pupil of the lens assembly 98 and also operate upon the subject image. However, since the length of the subject optical path is different from that of the data optical path, and further (for compactness of the camera) is at an angle thereto, the lenses 90 and 92 are insufficient to properly image the subject lens exit pupil into the entrance pupil of assembly 98. To compensate for, or correct for, the different path length and angle of the subject optical path 64 relative to the data optical path 78, an off axis section of a negative Fresnel lens is employed as lens 96a; with the power of the lens 96a correcting for the different distance, or subject path length, and the off axis cut compensating for, or that is redirecting, the rays from the subject lens exit pupil into the entrance pupil of the photo record camera. Hence, the lenses 90 and 92 operate on both subject and data images while the lens 96a compensates for the path angles and length difference therebetween. Advantageously, the diffuser/Fresnel assembly 54 is constructed as a compact sandwich of planar elements with the wedge lens 96b mounted in one corner of the diffuser 96a with this assembly in overlying relation to the analyzer plate 94 and interposed between the plate lenses 90 and 92.

As shown in FIG. 3, the recording camera 56 is mounted directly above the assembly 54 with its lens 98 directed downwardly towards this assembly. The camera 56 may be mounted for pivotal adjustment about axes 100 and 102 by side brackets 104 and a mounting support 106. The camera 56 is secured to the upper end of the side brackets 104 (only one of which is shown in FIG. 3) with the lower end of the side brackets depending below the lower edge of the camera. The lower end of the side bracket 104 is pivotally connected to a forwardly extending plate 108 of the support mount 106 by a stub shaft 110 which extends from the side bracket through a clearance hole in the plate 108. A screw 112, which passes through an arcuate slot 114 formed in the plate 108 and which is in threaded engagement with the side bracket 104, is provided to lock or clamp the recording camera 56 at a preferred angular position about the axis 100. The mounting bracket 106 is secured to the rear panel 16 with a plurality of screws 116 which pass through arcuate slots 118 formed through the rear portion of the mounting bracket 106 and engage threaded holes in the rear panel such that the rotatable position of the camera 56 about the axis 102 may be adjusted and the camera locked in place. The adjustable nature of the camera 56 allows the camera to be adjusted for the optimum image of the subject and data card at the strip film recording plane, as represented by the strip film segment SF in FIG. 4.

The recording camera 56 is designed to use 8 mm home movie type film that is widely available in inexpensive preloaded cartridges. In order to provide a recorded image quality superior to that normally available with this type of film, the recording camera 56 has a modified exposure aperture 120 which defines a double frame image area within which the recorded image is exposed with the long dimension of the data card image aligned along the longitudinal axis of the strip film and the short dimension of the data card image aligned along the lateral axis of the strip film. The recorded image is, in effect, rotated 90° from the usual orientation, and the image is recorded in a larger than standard format to provide enhanced image quality. Additionally, following each exposure operation, the film advance mechanism, such as the reciprocating claw 121, increments the strip film on essentially a double, rather than the standard frame basis.

Consequently, while the standard super 8 film frame shown dotted at 123 normally receives an image extending across a width X of the strip and along a length Y thereof, the camera system produces an image 125 of a length 2Y. Further, while the film would be normally advanced a given distance slightly greater than Y for each frame, in the described embodiment it is advanced, responsive to each exposure, a double frame distance slightly greater than 2Y or, that is, exactly twice the single frame advancement.

The camera 10 is provided with a character encoding display 122 (FIGS. 5 and 6) that images an operator-selected number sequence onto a portion of the recorded image film plane so that the recorded image of each identification card, as shown in FIG. 8, is uniquely encoded. The display 122 includes a multi-digit, seven segment LED board 124 with an image directing lenticule 126 mounted over each digit. The board 124 is mounted on a bracket 128 supported above the assembly 54 by posts 130 just outside of the image path or cone. A mirror 132 is also mounted on the bracket 128 just within the image cone and reflects the number image upward into the lens 98 of the recording camera 56. The digit display is connected by a cable 134 to appropriate decoding and digit driver circuitry (not shown) which controls the display 122. The control circuitry is also synchronously connected to the display 40 located on the rear panel 16 to provide the camera operator with the same number as the encoding number. The number displayed can be selected by the camera operator through controls 42a-c which provide for display incrementing and decrementing (fast and slow) and display reset. When the camera 10 is in operation, the displays 122 and 40 are incremented by one for each identification card and recorded image produced by an appropriate triggering switch (not shown).

The use of a single subject lens and the placement of all the optical elements of the present invention within a single housing provides a tamper-proof identification camera system in which it is impossible to operate the camera to produce an identification card without also producing a photo record of the complete card. This security advantage is contrasted to those prior camera system designs which use a subject lens for forming the identification card image and another, separate subject lens for forming the photo record image in which the latter lens can be covered and the camera operated to produce an identification card without also producing a complete photo record of the card.

In order to further enhance the security aspect of the present invention, various interlocks (not shown) may be provided to prevent operation of the camera system unless a film cartridge is in place and the recording camera is operative. For example, the controls 42a-d and the film cartridge 38 are locked behind the door 34 to prevent tampering with the photo record and, as previously indicated, the identification card exposure can only occur when the photo record camera is actuated since the primary shutter is only triggered by the opening of the photo record camera shutter.

In addition to the security advantages, the camera system of the present invention also provides a number of other advantages over prior designs. The photo record diffuser/Fresnel assembly, in addition to resolving the subject and data card images, provides a multi-function field lens using a compact, easily assembled optical unit. In addition, the enlarged image format in the recording camera provides an enhanced image normally associated with more expensive film formats and recording cameras, and the character encoder permits convenient encoding of each identification card image for administrative purposes.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. In an identification camera system of the type that provides a composite subject/data identification card and a photo record of the identification card and which has a housing that contains a subject optical system for directing light from a subject to a subject area of an identification card image plane and to a subject area of a photo record image plane and a data optical system for directing light from a data carrier to a data area of an identification card image plane and to a data area of a photo record image plane, the respective subject and data areas of the identification card image plane and the photo record image plane being mutually exclusive, the photo record image plane located at a film plane within a recording camera, the improvement comprising:
an optical compensation means for compensating the respective focal lengths and angles of the subject and data image paths to direct their images to the photo record image plane, said compensating means having a first lens arrangement for focusing the data image on the photo record image plane, and a second lens for compensating the subject image directed to the photo record image plane.

2. The system of claim 1 wherein said second lens both focuses and angularly redirects the subject image optical path.

3. The system of claim 2 wherein said first lens arrangement and said second lens are planar Fresnel elements formed in a compact sandwich assembly.

4. The system of claim 3 wherein the first lens arrangement comprises:
a pair of Fresnel lenses located on respective sides of said second lens in registration with both said subject and said data images.

5. The system of claim 4 wherein the improvement further comprises:
a diffuser plate located in the data image optical path; and
said second lens is located in a cut out portion of said diffuser plate.

6. The system of claim 1 wherein said second lens is a Fresnel wedge formed from an off axis section of a negative Fresnel lens to both focus and angularly redirect the subject image optical path.

7. The system of claim 1, further comprising:
means for adjusting the position of the strip film plane relative to the recorded image plane.

8. The system of claim 7 wherein said adjusting means permits adjustment of said recording camera about two orthogonal axes.

9. The system of claim 1, further comprising:
first display means for imaging an encoded identification character on at least one of said image planes, said first display means comprising a display board mounted outside of said camera system's image path, and a mirror mounted in said image path to receive and redirect the image of said display board to said one image plane.

10. The system of claim 9, further comprising:
second display means mounted in a position on said camera system to be visually accessible to an apparatus operator for displaying the identification character identical to that displayed by said first display means.

* * * * *